Nov. 28, 1950     O. A. HOFFMAN     2,531,732
CORNSTALK PULVERIZER

Filed Sept. 9, 1949     2 Sheets—Sheet 1

Oswald A. Hoffman
INVENTOR.

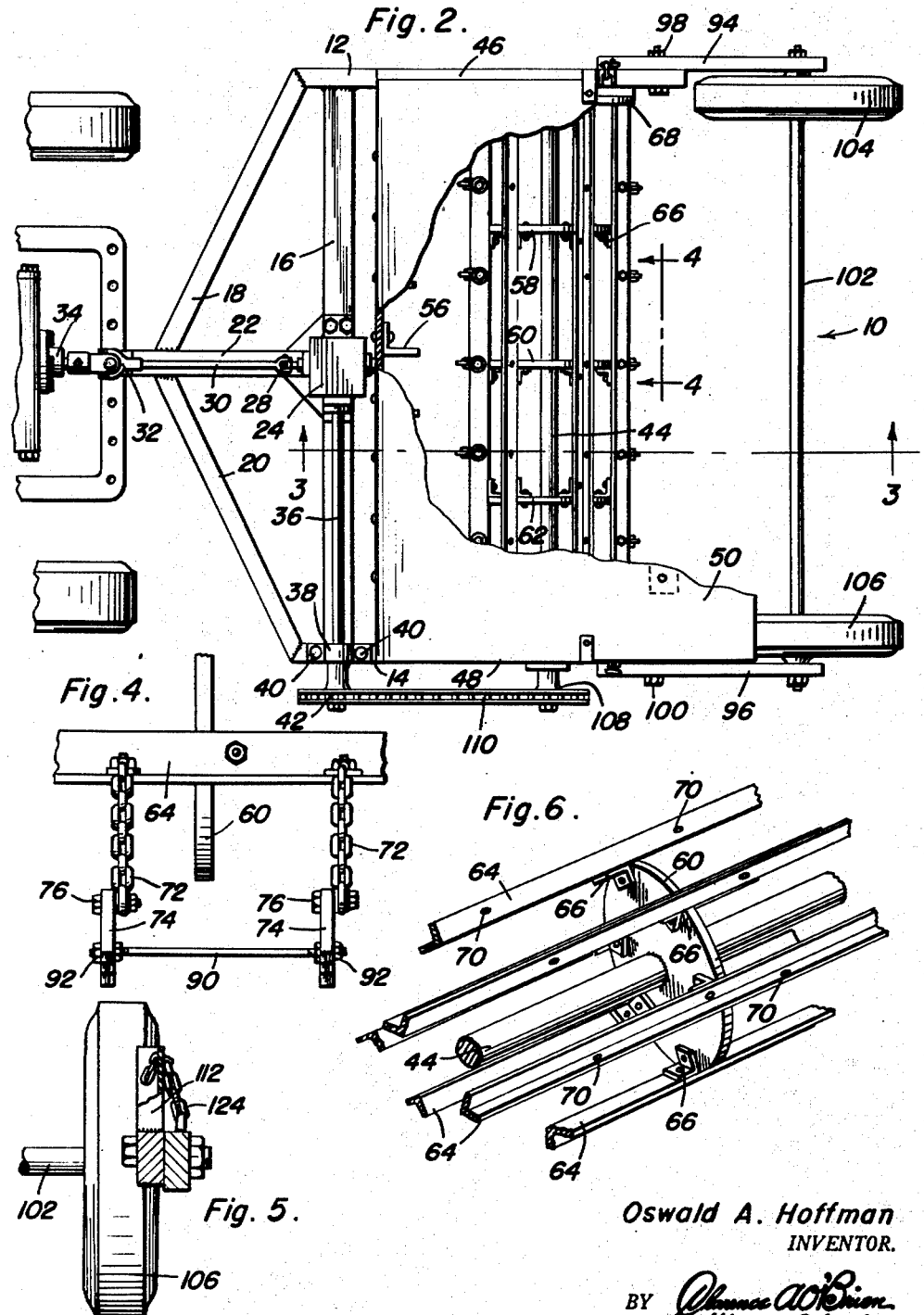

Patented Nov. 28, 1950

2,531,732

UNITED STATES PATENT OFFICE 2,531,732

CORNSTALK PULVERIZER

Oswald A. Hoffman, Decatur, Ind.

Application September 9, 1949, Serial No. 114,889

1 Claim. (Cl. 55—118)

This invention relates to farm machinery, and more particularly to a corn stalk pulverizer adapted to process corn stalks in a field after the ear corn has been removed.

An object of this invention is to provide a vehicle attachment for a tractor or the like, which will readily and efficiently pulverize the remaining corn stalks in a field after the ear corn has been removed.

Another object of this invention is to provide in a corn stalk pulverizer novel cutting and flaying means which are actuated through driven means operated by a power take off from the tractor.

A still further object of the invention is to provide a corn stalk pulverizer which may be drawn by a tractor and which includes a power driven shaft having cutting and flaying edges attached which when the tractor is driven forward will pulverize any growth over which the pulverizer passes, the flaying means yielding when solid objects such as stumps or rocks are encountered and passing over them while not disturbing the efficient operation of the pulverizer.

Other objects reside in the provision of a corn stalk pulverizer as a vehicle attachment for a tractor or the like, which is strong, durable, and efficient in operation, relatively simple in construction and manufacture, and easy to operate.

These, together with the various ancillary objects of the invention, which will become apparent as the following description proceeds, are attained by this corn stalk pulverizer, a preferred embodiment of which has been illustrated, by way of example only, in the accompanying drawings, wherein:

Figure 2 is a top plan view of the corn stalk pulverizer, parts being broken away to show other parts more clearly;

Figure 4 is an enlarged transverse vertical sectional view as taken along line 4—4 in Figure 2;

Figure 5 is an enlarged vertical sectional view as taken along line 5—5 in Figure 1;

Figure 6 is a perspective view, in an enlarged scale, of the several elements comprising the rotating mechanism to which the flaying and cutting means are attached.

Figure 1:
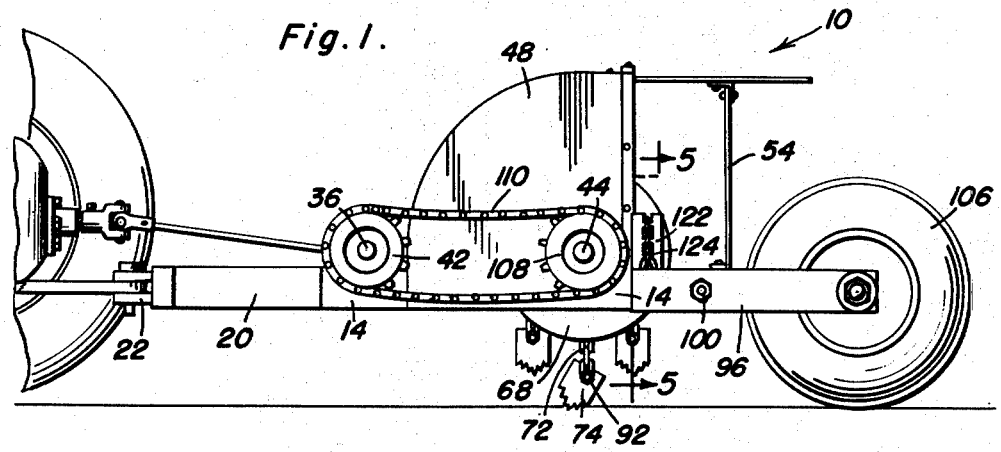
Figure 1 is a side elevational view of the preferred embodiment of the invention.
Figure 3:
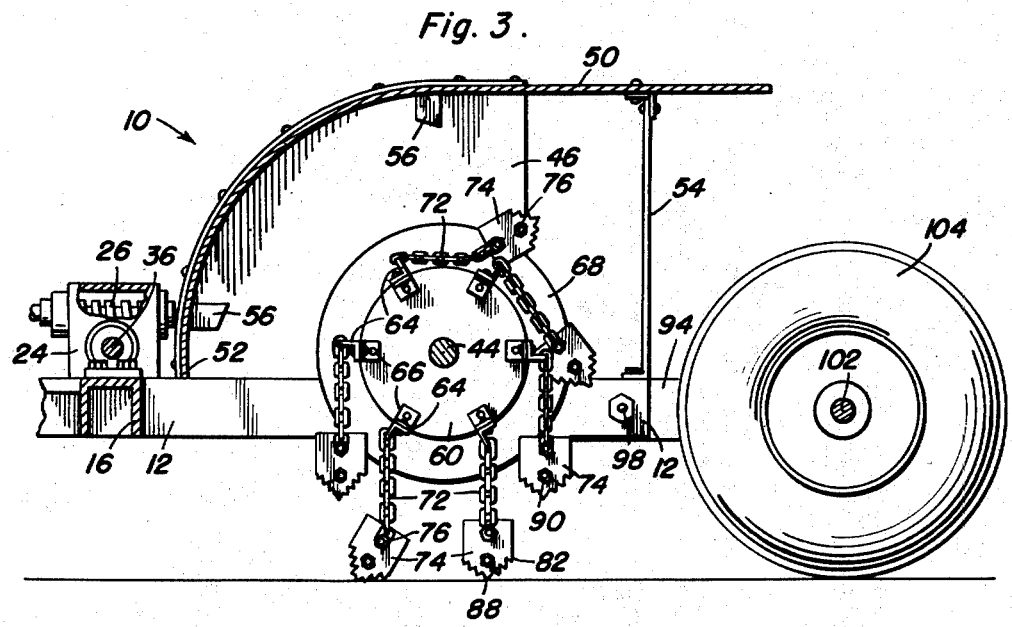
Figure 3 is an enlarged longitudinal sectional view as taken along line 3—3 in Figure 2.

With continued reference to the accompanying drawings, wherein like reference characters designate similar parts throughout the various views, attention is first directed to Figures 1 through 3 wherein numeral 10 generally designates the corn stalk pulverizer comprising the present invention. A pair of spaced parallel frame members 12 and 14 are provided and preferably are of channel-shape. These are joined together by transverse frame member 16 also of channel-shape. A pair of angularly disposed forwardly converging braces 18 and 20 are provided, and these are joined in such a manner as to leave an aperture through which a suitable draw bar 22 may extend.

Upon the transverse frame member 16 is bolted a gear box 24. A worm gear 26 is journaled in this gear box and the worm is connected through coupling 28 to shaft 30, and thence through universal coupling 32 to a prime mover 34 on the tractor. A gear on the shaft 36 engages the worm within the gear box. The shaft 36 is journaled to the frame member 14 by means of clamp 38 and bolts 40. On the shaft 36 is mounted a suitable sprocket wheel 42.

Journaled to the frame members by means of a hood is a transverse shaft 44. The hood consists of parallel side portions 46 and 48, and an arcuate cover plate 50 which abuts the frame at its forward end as at 52 and is supported by suitable braces 54 at its other end in a manner to be henceforth disclosed. A suitable number of knife blades 56 forming cutting edges are secured to the inner surface of the hood.

Referring now more particularly to Figures 2 and 6 it will be seen that a plurality of disks such as 58, 60 and 62 are secured to the shaft 44. In an annularly spaced manner, angle bars 64 are attached to the disks by means of angle brackets 66. A pair of end disks 68 are used to rigidify the structure of the shaft 44.

Figure 7:
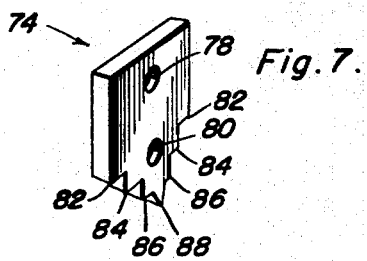
Figure 7 is a perspective view of one of the hammers forming a cutting means of the present invention.

Each of the angle members 64 are provided with a plurality of apertures 70 therethrough to which chains 72 are attached by suitable shackles. To the free ends of the chains 72 are attached hammers 74 by means of bolts 76. As best shown in Figures 3 and 7, each of the hammers 74 have a pair of apertures 78 and 80 therethrough, and a plurality of offset cutting edges such as shown at 82, 84, 86, and 88. The bar or rod 90 is used to join pairs of hammers 74 together as is shown in Figure 4 using bolts 92.

Between parallel frame extensions 94 and 96 bolted as at 98 and 100 to the frame members 12 and 14 respectively, is an axle 102 on which wheels 104 and 106 are mounted.

While the shaft 44 has been shown and described as being journaled through the parallel side members 46 and 48 of the hood, the shaft may suitably be journaled through the frame members 12 and 14 or an upwardly extending extension thereof. A sprocket wheel 108 is attached to the shaft and is in alignment with the sprocket wheel 42 on shaft 36. An endless chain 110 is used to transmit motion between the sprocket 42 and the sprocket 108. Thus it can be seen that as the prime mover 34 rotates the shaft 30 through universal coupling 32 the worm 26 is rotated which engages the gear on the shaft 36, which rotates shaft 36 thus rotating wheel 42. By means of chain 110, the wheel 108 is then rotated which in turn rotates shaft 44 and imparts a clock-wise rotation as is shown in Figure 3, to the pulverizing means comprising the chains and the hammers.

As best shown in Figures 1 and 5, the extensions 96 and 94 overlie the frame members 14 and 12 respectively which permit a pair of standards as at 112 to be secured to the frame members. A chain is then secured to the extension as at 124 and may be adjustably engaged within the standards 122 to determine the relative angular position of the extensions relative to the frame members. Thusly, the height of the hammers 74 above the ground may be readily adjusted against the wheels 104 and 106 must touch the ground and the bar 122 is attached to the tractor at a given height.

This pulverizer with flexible steel flays has an advantage over the ordinary steel blade or knife corn stalk cutters in that, should the flexible steel flays in this invention strike a stone or similar hard surface, they will not break, but will easily pass over the hard object without delaying the operation of the pulverizer. Additional advantage is also present over the blade or knife corn stalk cutter in that, where the ordinary cutter merely cuts the stalk into pieces, the pulverizer of the present invention swing the steel flays against the ground and cut and pulverize the corn stalk sufficiently to kill any corn borer moth which may be present.

Since from the foregoing, the construction and advantages of this corn stalk pulverizer are readily apparent, further description is believed to be unnecessary.

However, since numerous modifications will readily occur to those skilled in the art after a consideration of the foregoing specification and accompanying drawings, it is not intended to limit the invention to the precise embodiment of pulverizer shown and described, but all suitable modifications and equivalents in construction and function may be resorted to which fall within the scope of the appended claim.

Having described the invention, what is claimed as new is:

A cornstalk pulverizer comprising a frame, a shaft journaled to said frame, a plurality of spaced disks attached to said shaft, a plurality of annularly spaced cross-bars secured to said disks, a plurality of chains secured to said cross-bars, hammers having a plurality of cutting edges thereon secured to said chains, and rods positioned between pairs of hammers, and each rod being secured to a pair of hammers, each of said hammers having a body portion, a series of offset portions extending from said body portion and forming said plurality of cutting edges, a plurality of apertures in said body portion, said chains being secured to said body portion through one of said apertures, the other aperture being adapted to receive a cross rod connecting said hammer with another hammer.

OSWALD A. HOFFMAN.

REFERENCES CITED

The following references are of record in the file of this patent:

UNITED STATES PATENTS

| Number | Name | Date |
|---|---|---|
| 1,035,056 | Shubert et al. | Aug. 6, 1912 |
| 1,263,965 | Twitchell | Apr. 23, 1918 |
| 1,505,572 | McDonald | Aug. 19, 1924 |
| 1,552,750 | Lain | Sept. 8, 1925 |
| 2,506,054 | Agee et al. | May 2, 1950 |